PULSE TRANSFER DEVICES

Filed April 29, 1958 3 Sheets-Sheet 1

Inventor
G. N. Hounsfield
By [signature]
Attys.

Inventor
G. N. Hounsfield
By Glascock Downing & Seebold
Attys.

Feb. 23, 1965 G. N. HOUNSFIELD 3,171,101

PULSE TRANSFER DEVICES

Filed April 29, 1958 3 Sheets-Sheet 3

Inventor
G. N. Hounsfield
By Glascock Downing & Seebold
Attys.

United States Patent Office 3,171,101

Patented Feb. 23, 1965

3,171,101

PULSE TRANSFER DEVICES

Godfrey Newbold Hounsfield, Sutton-on-Trent, near Newark, England, assignor to Electric & Musical Industries Limited, Hayes, Middlesex, England, a company of Great Britain Filed Apr. 29, 1958, Ser. No. 731,735
Claims priority, application Great Britain, Apr. 30, 1957, 13,799/57
12 Claims. (Cl. 340—174)

This invention relates to pulse transfer devices such as are employed in information handling apparatus.

One form of shifting register which has been proposed hitherto consists of a series of cores of magnetic material with windings linking each core to its immediate successor via a transistor amplifier. The register utilises the properties of the hysteresis loop and the binary digit values "0" and "1" are assigned to opposite states of remanent magnetism of the cores. In addition to the linking winding coupling adjacent cores, each core has a winding to which advancing current pulses are applied so that any core in the "1" state will be changed to the "0" state thereby transmitting a current pulse via the transistor amplifier to set the next core to the "1" state, but a core in the "0" state will not be affected and no current pulse will be transmitted. It is necessary that such advancing current pulses are fed in two interlaced pulse trains, one train to the odd numbered cores and the other train to the even numbered cores. The reason for this is that the advancing current pulses would overcome any transferred current pulse from the transistor amplifiers if the two occurred simultaneously and thus the stored information would be lost. As a result of using two interlaced advancing pulse trains it becomes necessary to use two cores per digit, otherwise adjacent digits of the stored data would be superimposed on each other and the data confused. Such resisters therefore require two cores and two transistors per digit place and two trains of advancing pulses.

An object of the present invention is to provide an improved shifting register in which the above mentioned difficulties are overcome and in which only a single core and a single transistor are required for each digit place, and only one train of advancing pulses is needed.

However, in pulse transfer devices in general, and not merely in shifting registers, the problem is often encountered of registering a binary condition to a two state device which condition arises due to the influence of a pulse which at the same time tends to counteract the registration in said device. This situation is encountered for example in achieving "non-destructive" reading of a core, which is tantamount to shifting a binary condition from a core under the influence of a pulse and then re-registering the condition.

According to the present invention there is provided pulse transfer devices comprising a two state device, means for deriving a signal representing the condition to be registered in response to a pulse which tends to hold said device in a predetermined state for the duration of the pulse, means for storing said signal for a period which continues after said pulse, and for applying the signal from the storage means to said device to register the corresponding condition after the end of the pulse.

In practice the present invention has a variety of different applications and according to one application of the present invention there is provided pulse transfer devices comprising a plurality of two state devices, means for applying pulses simultaneously to said devices tending to switch said devices to predetermined states, means for deriving signals from at least a group of said devices in response to changes of state produced by said pulses, means for individually storing said signals for a period which continues after said pulses and for applying the signals from the storage means to one of said devices with selected polarities to condition said device in dependence upon the stored signals, and means for simultaneously terminating the storage of said signals.

In order that the invention may be clearly understood and readily carried into effect, it will now be more fully described with reference to the accompanying drawings in which.

Figure 1:
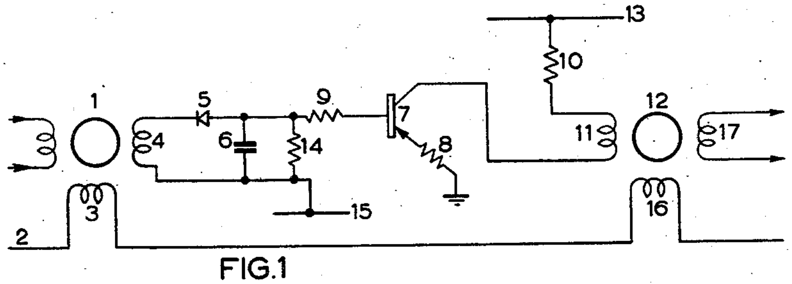
FIGURE 1 illustrates two stages of a shifting register according to one embodiment of the invention.

Referring to FIGURE 1 of the drawings, suppose that the magnetic core 1 is set to the "1" state, an advancing pulse at 2 through the winding 3 changes the core 1 to the "0" state thereby causing an output pulse in the winding 4 which passes through the diode 5 to charge the condenser 6 in the negative direction. This negative voltage when applied across the emitter base circuit of the transistor 7 via resistors 8 and 9 in the emitter and base leads respectively causes the transistor 7 to "bottom," the current being determined mainly by the current limiting resistor 10, and this current through the winding 11 tends to cause the magnetic core 12 to be set to the "1" state, corresponding to a shift of state from core 1 to core 12. Resistor 10 is connected to source 13 of polarising potential for the transistors. A resistor 14 is connected across the condenser 6 to discharge it. A source of bias voltage for the transistor 7 is connected to the condenser 6 and resistor 14 at 15.

However, it will be appreciated that the advancing pulse which, through the winding 3, changes the core 1 to the "0" state, is also applied to the winding 16 and has sufficient amplitude to counteract the effect of the current in winding 11 and so the shift tends to be counteracted. But the advancing pulse is of shorter duration than the pulse through the windings 11 from the transistor 7, because of the lengthening effect of the condenser 6 and the resistor 14 in the emitter base circuit of the transistor 7 which maintains it in the "bottomed" condition for a time after the termination of the advancing pulse. Thus the core 12 is set to the "1" state after the advancing pulse ends. The condenser 6 is substantially discharged by the resister 14 before the next advancing pulse. When the core 12 is set to the "1" state at the end of the advancing pulse there is of course an output pulse in the winding 17. Similarly if the core 1 is reset to state "1" by a shift from a preceding stage, or by independent entry, there is an output pulse in the winding 4. However, these other output pulses, being of opposite polarity to that produced when the core 1 is changed to the "0" state, are blocked by the diode 5 and the corresponding diode in the coupling from core 12 to the succeeding core thereby prevented from interfering with the operation of the circuit. The purpose of the resistors 8 and 9 is to reduce the magnitude of the drive to the transistor 7 so that no appreciable "hole storage" effect is obtained.

Figure 2:
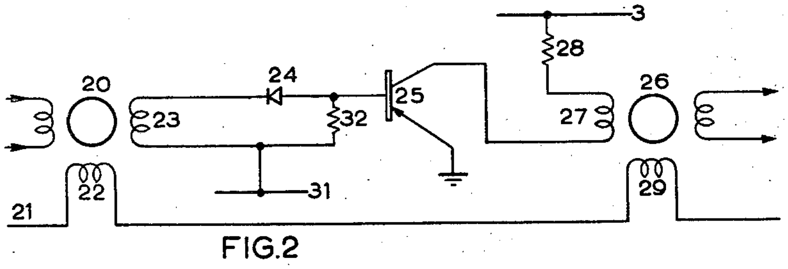
FIGURE 2 illustrates one stage of a shifting register according to a second embodiment of the invention.
Figures 3, 4:
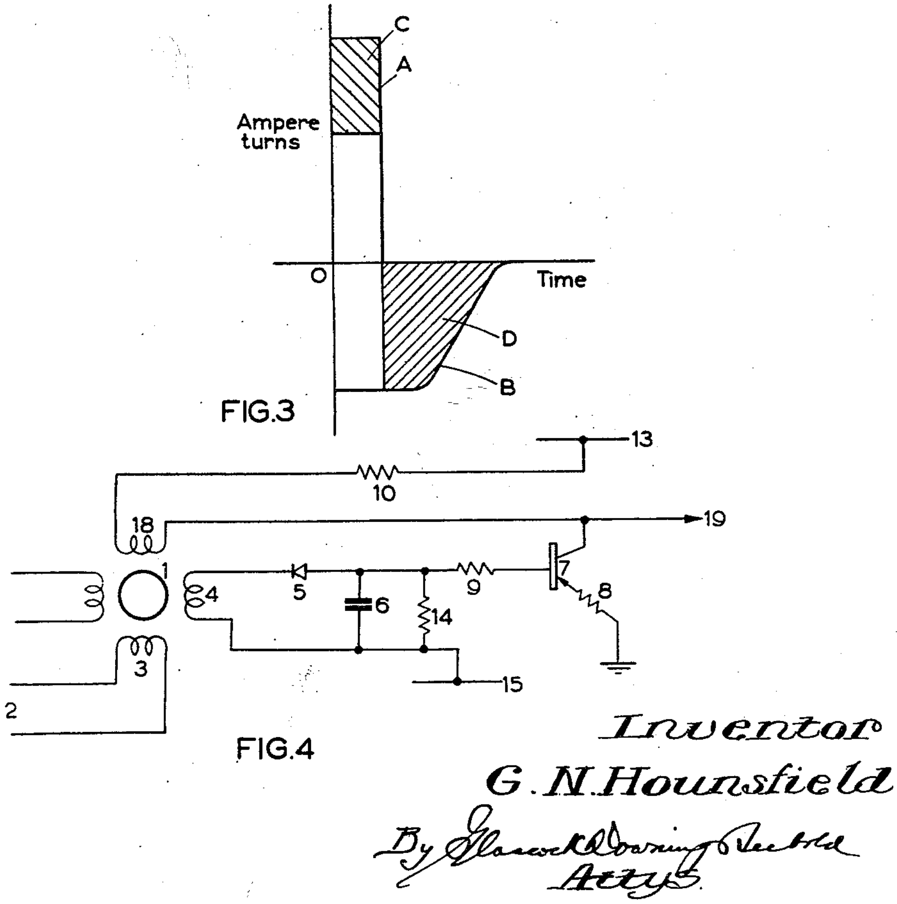
FIGURE 3 is a diagram explanatory of the operation of the embodiment illustrated in FIGURE 2.
FIGURES 4, 5 and 6 illustrate modifications of the embodiment of the invention shown in FIGURE 1.

Referring to FIGURES 2 and 3 of the drawings, if the core 20 is in the "1" state, then an advancing pulse through the winding 22 will reset it to the "0" state, and cause thereby an output pulse in the winding 23 which being negative, passes through the diode 24 to drive the transistor 25 to the "bottomed" condition very hard. Now it is a property of a transistor that if it is "bottomed" forcefully it continues to conduct for a time after the cessation of the pulse which caused it to "bottom". This is known as the "hole storage effect." So referring to FIGURE 3 A represents the advancing pulse to the cores 20 and 26 by the ampere turns in cores 22 and 29 and B represents the output current pulse from the transistor 25 setting the core 26 to the "1" state through winding 27. Thus if we consider a core, the shaded part C of FIGURE 3 represents the energy available to reset the core to the "0" state and the shaded part D, the energy available to set to the "1" state at the termination of the advancing pulse.

Referring to FIGURE 2 again the output from the transistor 25 sets the core 26 to the "1" state through winding 27 at the termination of the advancing pulse, and in this manner the information is stepped from one core to the next. Of course had the core 20 been in the "0" state initially then there would have been substantially no output from winding 23. The current limiting resistor 28 determines the value of current through the winding 27 and the transistor 25, and is connected to a source 30 of polarising potential for the transistor. The end 31 of the winding 23 remote from the diode 24 may be connected to a source of bias potential for the transistor or earth. The function of the diode 24 is the same as that of the diode 5 of FIGURE 1. The resistor 32 acts as a leak resistor to apply the bias voltage to the base of the transistor 25.

The arrangement of FIGURE 2 may be simplified by the omission of the diode 24 when the device is used as a one-bit shifting register. Also in this case the emitters of the stages may be connected to a common resistor the other end of which is earthed. Again in this case the current limiting resistor 28 may be used for any number of stages.

Although it has been stated that when a core which is in the "0" state is reset to the "0" state by the advancing pulse that no output is obtained, in fact a certain reduced output is obtained but it may be arranged that it is so small compared with the true output pulse that no ambiguity results. It is another advantage of the present invention that there is a greater difference between the effect of a true output pulse from a core which has been reset from the "1" state to the "0" state and the effect of a false output pulse from a core whose remanent state is unchanged.

FIGURE 4 illustrates a modification to the embodiment of the invention shown in FIGURE 1 in which the transistor 7, instead of being arranged to pass the information from the core 1 to the core 12, is connected in a regenerative arrangement, whereby the information stored in the core 1 is rewritten there at the end of the pulse by means of the winding 18. All components of the arrangement of FIGURE 4 which are equivalent to those of the arrangement of FIGURE 1 are identically numbered. Positive output pulses representative of the information stored in the core 1 may be obtained at 19, so that the information may be read without destroying the information.

Figure 5:
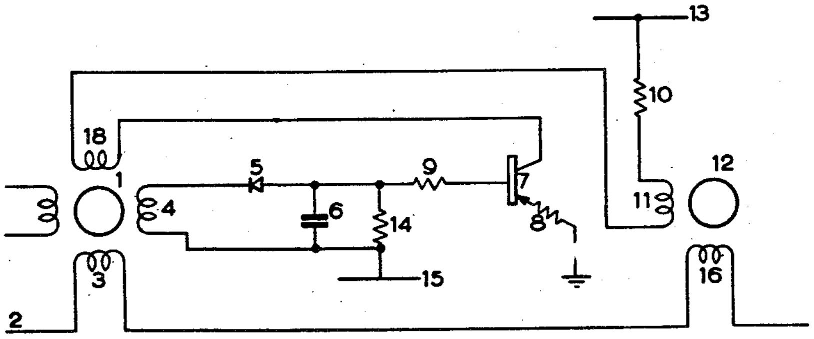

FIGURE 5 shows a further modification of the invention combining the circuit arrangements of both FIGURES 1 and 4 whereby the information from the core 1 is retained there as well as being transferred to the core 12. The circuit components are numbered as their equivalents in the previous arrangements.

Figure 6:
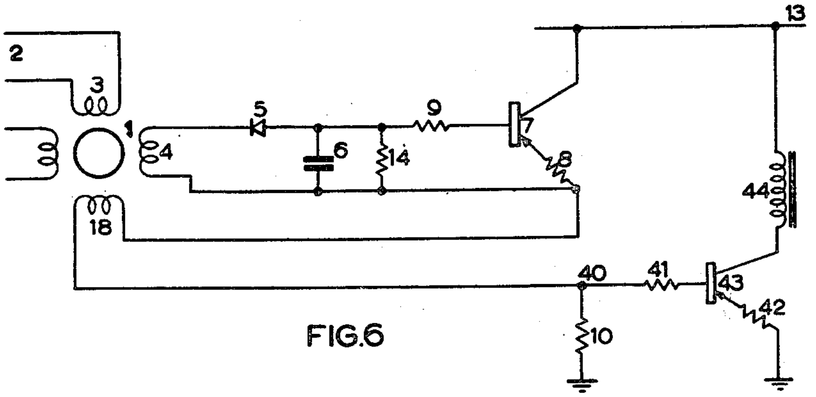

The modification of the invention shown in FIGURE 6 is similar to FIGURE 4 but has been altered to provide negative output pulses at the point 40 which may be applied via resistors 41 and 42 across the emitter-base circuit of the transistor 43, thereby obtaining a further stage of amplification without the need for an intermediate inverting stage. The output load of the transistor 43 is shown as a relay coil 44 which may for example operate a line printer. Circuit components performing the same function as in previous arrangements are numbered identically.

Although the above modifications have been described as applied to the embodiment illustrated in FIGURE 1, it might equally well have been described as applied to the embodiment illustrated in FIGURE 2.

The invention has been described as applied to the transfer of information from one core to another, or from one core and back to itself, or both. However, this transfer of information may be arranged to be conditional upon the existence of other input pulses to the core to which the information is to be transferred, by the use of smaller windings or smaller currents in the output circuits of the transistors. Similarly, an inhibition connection may be obtained by connecting the output winding the other way round.

If it is desired that the output of a core should inhibit the setting of a second core into the "1" state, it would be arranged that the output of the first core when amplified would be a pulse which would oppose the pulse tending to set the second core into the "1" state. In this case it is important to obtain output pulses of uniform length despite non-uniformity of condensers and variation in "hole-storage" times of transistors. It has been found possible to overcome this by superimposing on the bias supplies for the transistors a positive going square wave which cuts off all the transistors simultaneously, thereby ensuring equal pulse length at all times.

Figure 7:
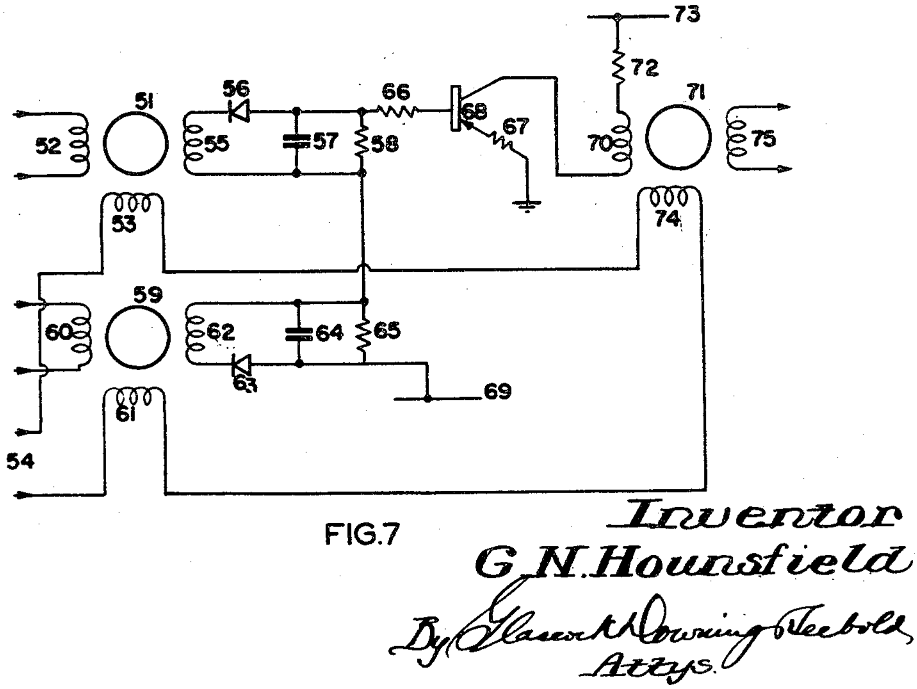
FIGURE 7 illustrates an embodiment of the invention in which the transfer of information from one magnetic core to another is inhibited selectively according to information stored in a third magnetic core.

Referring to FIGURE 7, the magnetic core 51 receives information from previous circuitry not shown in the drawing as it forms no part of the present invention, by means of winding 52. The winding 53 receives advancing pulses from source 54 thereby causing the core 51 to produce an output pulse in the winding 55. This output is of such polarity as to be substantially uninhibited by the diode 56 and therefore charges up the condenser 57. The resistor 8 is shunted across the condenser 7.

The magnetic core 59 receives information from other apparatus which is not shown in the drawing via the winding 60. Advancing pulses from the source 54 through winding 61 produce output pulses in the winding 62 depending on the remanent state of the core 59. These output pulses from the winding 62 are of such polarity as to be unaffected by the presence of the diode 63 and therefore the condenser 64, which is shunted by the resistor 65, is charged. The condensers 57 and 64 are connected in series between source 69 of bias potential for the transistor 68 and the resistor 66. The other terminal of resistor 66 is connected to the base electrode of said transistor. A resistor 67 is connected between the emitter electrode of the transistor 68 and earth. The collector of the transistor 68 is connected via winding 70, on the magnetic core 71, and current limiting resistor 72 to a source 73 of polarising voltage for the transistors.

The magnetic core 71 receives advancing pulses from source 54 via winding 74, output pulses being induced in winding 75.

The operation of the circuit is as follows:

If the magnetic core 51 is set to the "1" state by means of winding 52, an advancing pulse from the source 54 through winding 53 will change the core to the "0" state thereby inducing in the winding 55 a voltage pulse which is uninhibited by the diode 56 and charges the condenser 57 so that its upper terminal in the drawing is more negative than the lower.

Suppose that the condenser 64 is uncharged, as will be the case if there is no output from the core 59, then the base of the transistor 68 will be driven negative with respect to the emitter and the transistor will bottom causing a current determined mainly by the resistor 72 to flow through the winding 70 tending to set the core 71 to the "1" state.

As the advancing pulses from the source 54 are of short duration relative to the time constant of the network provided by the condenser 57 and the resistor 58, but the magnitude of said advancing pulses is sufficiently great in conjunction with the winding 74 to change the core 71 to the "0" state in spite of the presence of the current through the transistor 68 and winding 70, the core 71 will be interrogated by the advancing pulse and changed to the "0" state thereby and at the end of the advancing pulse will be set to the "1" state by the current through the transistor 68 and the winding 70 because the transistor is held in the bottomed condition by the charge held on the condenser 57. The resistor 58 substantially discharges the condenser 57 before the next advancing pulse.

The resistors 66 and 67 limit the current drive across the base-emitter circuit of the transistor 68 and prevent thereby a substantial hole-storage effect.

If the core 59 as well as the core 51 is initially set to the "1" state then an advancing pulse from the source 4 will change both said cores to the "0" state thereby inducing voltages in the windings 62 and 65 respectively. The voltage induced in the winding 55 charges the condenser 57 in the aforementioned manner. The voltage included in the winding 62 behaves in a similar way to that induced in the winding 55, charging the condenser 64 so that the common point of condensers 57 and 64 is more positive than the potential of the bias source 69. Thus the potential across the condenser 64 tends to nullify the effect of the potential across the condenser 57 and thereby inhibit the transfer of information from the core 51 to the core 71. The time constant of the network consisting of the condenser 64 and resistor 65 is arranged to be similar to or slightly greater than the time constant of the network consisting of the condenser 57 and the resistor 8.

The purpose of the diodes 56 and 63 is to prevent the discharge of the condensers 57 and 64 respectively through the associated windings and also to prevent spurious pulses from the cores 51 and 59, when they are set to the "1" state by incoming pulses, from interfering with the action of the circuit.

Clearly, a number of inputs from a multiplication of components 51, 52, 53, 55 and 56 connected across the condenser 57 may be used if desired and inhibited by a single inhibiting arrangement as shown. Or conversely, a single input may be inhibited by any one of a number of other inputs by multiplication of components 59, 60, 61, 62 and 63 connected across condenser 64. Similarly a number of inputs may be inhibited by any one of a number of other inputs by suitable multiplication of components.

Figure 8:
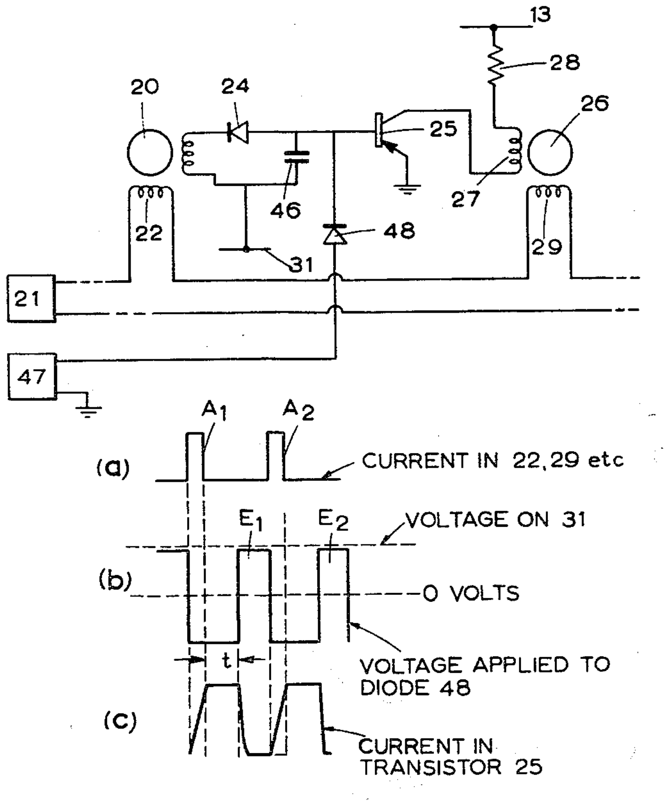
FIGURE 8 shows a modification of FIGURE 2.

In FIGURE 8 there is shown a modification of FIGURE 2 in which there is superimposed on the bias supplies for the transistors a positive square wave which acts for all the transistors simultaneously thereby ensuring that one function does not overrun another. FIGURE 8 is generally similar to FIGURE 2 and corresponding parts in the two figures are denoted by the same references. The resistor 32 of FIGURE 2 is however replaced by a condenser 46 and the base of the transistor 25 is connected to a pulse source 47 by way of a diode 48, which has its cathode nearer the base of the transistor. The pulses from the source 47 occur at the same frequency as the advancing pulses so that one pulse occurs for each advancing pulse. For example if $A_1$ and $A_2$ in diagram (*a*) represent two advancing pulses, $E_1$ and $E_2$ in the diagram (*b*) may represent the corresponding pulses from the source 47. These pulses are termed "turn off" pulses. The pulses $E_1$ and $E_2$ are positive pulses which begin at times *t* after the ends of the corresponding advancing pulses and the ends of which are substantially coincident with the beginning of the advancing pulses. Assume, for example, that the transistor 25 has been rendered conductive by the advancing pulse $A_1$ to shift state "1" from the core 20 to the core 26 and that by reason of the hole storage effect the transistor tends to remain conducting for a time which is at least as great as *t*. However when the pulse $E_1$ begins the diode 48 conducts and the base of the transistor is raised to such a high positive potential that the conduction of the transistor is rapidly stopped as indicated by the waveform diagram (*c*). The turn off pulses are applied of course to all other transistors in the register and therefore all the transistors are cut off substantially simultaneously. A condenser 46 is used in place of the resistor 32 to increase the discrimination of the register against noise. Moreover the diode 48 may be replaced by a resistor but a diode is preferred since it enables a smaller condenser to be used for 46 than would otherwise be the case with a consequent shortening of the interval between the occurrence of an advancing pulse 21 and the switching on of the transistor 25 assuming that the core 20 is in state "1" when the advancing pulse occurs.

It will be understood that turning off pulses may be used in all other forms of the invention illustrated and their use is particularly advantageous in arrangements such as FIGURES 7 where the output current of one transistor is employed to counteract the effect of the output current of another transistor.

Furthermore instead of applying the turn off pulses as indicated, they may be applied to the bias line 31 to turn off the transistors via the condenser 46 and the corresponding condensers in other stages.

What I claim is:

1. A pulse transfer device comprising a switchable two-state element, a source of periodic pulses, means for applying periodic pulses from said source to said element to cause said element to switch from a first state to a second state, means responsive to said periodic pulses from said source for selectively producing data signals representing said first state to be registered in said element, a transistor amplifier, an input circuit connected from said producing means only to said amplifier for applying said data signal thereto to cause said amplifier to produce output signals, said input circuit being independent of any coupling to said element, an output circuit for applying said output signal to said element to register said first state therein, said transistor amplifier including means for storing an applied data signal for a period which continues after the termination of the periodic pulse in response to which it was produced, thereby to register said first state in said element after said termination, a source of turn-off pulses which occur in the intervals between said periodic pulses, and means for applying said turn-off pulses to said transistor amplifier so as to terminate said output signals.

2. A pulse transfer device comprising a switchable two-state element, a source of periodic pulses, means for applying periodic pulses from said source to said element to cause said element to switch from a first state to a second state, means responsive to said periodic pulses from said source for selectively producing data signals representing said first state to be registered in said element, a transistor having a base emitter and collector, an input circuit connected from said producing means only to the base emitter path of said transistor for applying said data signals to said transistor in a sense to induce an emitter-collector current in said transistor, said input circuit being independent of any coupling to said element, an output circuit responsive to said increased emitter-collector current to tend to register said first state in said element, said input circuit and said transistor including means for storing an applied data signal for a period which continues after the termination of the periodic pulse in response to which it was produced, thereby to register said first state in said element after said termination, a source of turn-off pulses which occur in the intervals between said periodic pulses, and means for applying said turn-off pulses to said transistor so as to terminate said output signals.

3. An electrical circuit comprising at least a first and a second bistable magnetic cored device, each of said core devices having an input winding, an output winding, and a shift winding, means for coupling successive cores, each of said coupling means including a transistor having a base, an emitter, and a collector, a diode connecting the output winding of said first core device to the base of said transistor independently of any winding on said second core device, said diode being poled to block the flow of current from said base following the coupling of a signal from the output winding of said first core device to said base, means connecting the emitter-collector circuit of said transistor in series with the input winding of said second core device, and a shift signal source connected to said shift winding of each of said core devices, said shift signal source having a signal amplitude large enough to switch said magnetic core devices unconditionally to one bistable state.

4. An electrical circuit comprising at least a first and second bistable magnetic core device, each of said core devices having an input winding, an output winding, and a shift winding, means for coupling successive cores, each of said coupling means including a transistor having a base, an emitter, and a collector, an impedance means having a relatively high impedance with respect to the emitter-collector circuit impedance of said transistor, said impedance means connecting the output winding of said first core device directly to the base of said transistor and constituting the sole input connection of said base, means connecting the emitter-collector circuit of said transistor in series with the input winding of said second core device, and a shift signal source connected to said shift winding of each of said core devices, said shift signal source having a signal amplitude large enough to switch said magnetic core devices unconditionally to one bistable state.

5. A device according to claim 1 wherein said switchable element compirses a magnetisable core have a winding included in the output circuit of said amplifier.

6. A device according to claim 2, said storage means comprising the emitter-base path of said transistor, said transistor having external circuit connections to cause a derived signal to induce emitter-collector current in said transistor continuing after the pulse by which the signal is derived.

7. A device according to claim 2, said input circuit comprising a path including a condenser and a bias source connected between the base and emitter of said transistor, and said means for applying turn-off signals to said transistor including means for applying pulses to said path between said condenser and the base of the emitter.

8. A device according to claim 7, said path being connected in parallel with the series combination of a one way device and means for producing said data signals.

9. A device according to claim 1, wherein said means for selectively producing data signals comprises another switchable two-state element preceding said first mentioned switchable two-state element, means for applying said periodic pulses to said preceding element tending to switch said preceding element to a predetermined state, and means for deriving said data signals in response to a change of said preceding element to said predetermined state from a different state, means being provided for applying said periodic pulses also to the first mentioned element to cause that device to constitute a source of data signals for a subsequent switchable two-state element.

10. A device according to claim 1, wherein said storage means is included in said transistor amplifier which, in response to the data signal to be stored, is driven to conduction continuing after the end of the periodic pulse by which the data signal is derived.

11. A device according to claim 9 comprising a further switchable two-state element, means for applying said periodic pulse to said further element tending to switch said further element to a predetermined state and means for deriving further signals in response to a change of said further element to said predetermined state from a different state, said input circuit being arranged to apply both said data signals and said further signals to said amplifier to cause said amplifier to produce output signals.

12. A device according to claim 1 wherein said storage means includes a condenser and a one way device for charging said condenser in response to the data signal to be stored, there being provided means responsive to said turn-off pulses for discharging said condenser thereby to terminate the storage.

References Cited by the Examiner

UNITED STATES PATENTS

| | | | |
|---|---|---|---|
| 2,652,501 | 9/53 | Wilson | 340—174 X |
| 2,708,722 | 5/55 | An Wang | 340—174 X |
| 2,747,110 | 5/56 | Jones | 340—174 X |
| 2,863,138 | 12/58 | Hemphill | 340—174 |
| 2,866,178 | 12/58 | Lo | 340—174 X |
| 2,876,438 | 3/59 | Jones | 340—174 |
| 2,911,626 | 11/59 | Jones et al. | 340—174 |

IRVING L. SRAGOW, *Primary Examiner.*

STEPHEN W. CAPELLI, EVERETT R. REYNOLDS, *Examiners.*